United States Patent
Ishihara (10) Patent No.: US 10,337,919 B2
(45) Date of Patent: Jul. 2, 2019

(54) OPTICAL UNIT AND SPECTROMETER PROVIDED WITH SAME

(71) Applicant: SHIMADZU CORPORATION, Kyoto-shi, Kyoto (JP)

(72) Inventor: Yugo Ishihara, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/756,406

(22) PCT Filed: Sep. 1, 2015

(86) PCT No.: PCT/JP2015/074861
§ 371 (c)(1),
(2) Date: Feb. 28, 2018

(87) PCT Pub. No.: WO2017/037872
PCT Pub. Date: Mar. 9, 2017

(65) Prior Publication Data
US 2018/0245980 A1 Aug. 30, 2018

(51) Int. Cl.
*G01J 3/28* (2006.01)
*G01J 3/36* (2006.01)
*G01J 1/44* (2006.01)
*G01J 3/18* (2006.01)

(52) U.S. Cl.
CPC . *G01J 3/36* (2013.01); *G01J 1/44* (2013.01); *G01J 3/18* (2013.01)

(58) Field of Classification Search
CPC ........ G01J 3/28; G01J 3/18; G01J 3/36; G01J 3/02; G01J 3/44; G01J 3/42; G01J 1/20; H04L 31/0232; H04N 9/04
See application file for complete search history.

(56) References Cited

U.S. PATENT DOCUMENTS

2013/0155401 A1* 6/2013 Muto ................ G01J 3/28
356/300

FOREIGN PATENT DOCUMENTS

| JP | 3-156323 A | 7/1991 |
|---|---|---|
| JP | 3-225284 A | 10/1991 |
| JP | 08-193945 A | 7/1996 |
| JP | 2001-324390 A | 11/2001 |
| JP | 2003-043369 A | 2/2003 |
| JP | 2015-141033 A | 8/2015 |

OTHER PUBLICATIONS

International Search Report for PCT/JP2015/074861 dated Dec. 1, 2015 [PCT/ISA/210].

* cited by examiner

*Primary Examiner* — Abdullahi Nur
(74) *Attorney, Agent, or Firm* — Sughrue Mion, PLLC (57) ABSTRACT

A PDA 5 has a plurality of light receiving elements. An A/D converter 30 converts an output signal from each of the light receiving elements of the PDA 5. A conversion processing unit 42 sequentially executes, for the plurality of light receiving elements, a conversion process of converting an output signal from an identical one of the light receiving elements at least twice within a preset time range with the A/D converter 30, to acquire at least two output values. An average value calculation unit 43 calculates an average value of the at least two output values for each of the light receiving elements acquired by the process executed by the conversion processing unit 42.

4 Claims, 7 Drawing Sheets

OPTICAL UNIT AND SPECTROMETER PROVIDED WITH SAME

TECHNICAL FIELD

The present invention relates to an optical unit including an image sensor having a plurality of light receiving elements, and converting an output signal from each of the light receiving elements of the image sensor with an A/D converter, and a spectroscope including the optical unit.

BACKGROUND ART

In various optical apparatuses such as a spectrometer, an image sensor having a plurality of light receiving elements is used. For example, Patent Document 1 noted below discloses a spectroscope including a photodiode array detector which is an exemplary image sensor. The spectroscope converts an output signal from each of the light receiving elements of the photodiode array detector with an A/D converter.

In each of the light receiving elements of the image sensor of this kind, charges are accumulated in accordance with the amount of received light, and an analog signal corresponding to the charge amount is converted into a digital signal by an A/D converter. By such a conversion process being sequentially executed at fast speed for each of the plurality of light receiving elements, one output value corresponding to the received light amount per light receiving element is acquired. Based on the output values, received light amounts at respective wavelengths are acquired as spectrum data.

Figure 7:
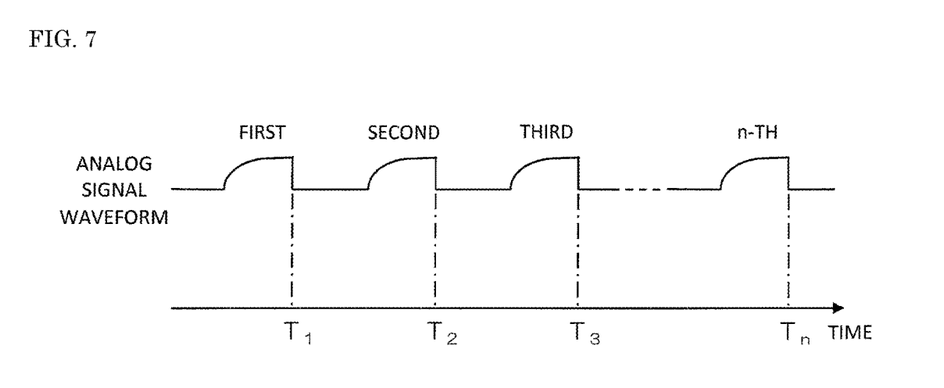
FIG. 7 is a timing chart for describing a conventional mode of converting an output signal from each of a plurality of light receiving elements with an A/D converter.

FIG. 7 is a timing chart for describing a conventional mode in converting output signals from a plurality of light receiving elements with an A/D converter. In this example, a description will be given of the case where analog signals from n-pieces (where n is a natural number) of light receiving elements are converted into digital signals with an A/D converter.

As shown in FIG. 7, the waveform of an analog signal output from each of the light receiving elements appears as a rectangular wave with a mild rising edge, due to the influence of an image sensor or the time constant of the circuit. Accordingly, the analog signal output from each of the light receiving elements is converted by the A/D converter at a certain timing $T_n$ (where n is a natural number) where the waveform fully rises, and thereafter the process transits to the next light receiving element.

By such a process being sequentially executed at timings $T_1$ to $T_n$ corresponding to respective light receiving elements, one scan operation ends. That is, in one scan operation, one output value is acquired for each of the light receiving elements. During the analysis, by such a scan operation being repeatedly executed, an output value for each of the light receiving elements is obtained at a predetermined cycle.

PRIOR ART DOCUMENTS

Patent Documents

Patent Document 1: Japanese Patent Application Publication No. 8-193945

SUMMARY OF THE INVENTION

Problems to be Solved by the Invention

The above-described conventional mode can just acquire one output value per light receiving element in one scan. Accordingly, there exists a problem that, when an output value of any of the light receiving elements becomes an inaccurate value due to the influence of various noises such as photon shot noises of a photodiode array detector and noises on the circuit, the analysis result is largely influenced.

The present invention has been made in view of the above-described circumstances, and an object of the present invention is to provide an optical unit less susceptible to the influence of noises and a spectroscope including the optical unit.

Means for Solving the Problems (1) An optical unit of the present invention includes: an image sensor, an A/D converter, a conversion processing unit, and an average value calculation unit. The image sensor has a plurality of light receiving elements. The A/D converter converts an output signal from each of the light receiving elements of the image sensor. The conversion processing unit sequentially executes, for the plurality of light receiving elements, a conversion process of converting an output signal from an identical one of the light receiving elements at least twice within a preset time range with the A/D converter, to acquire at least two output values. The average value calculation unit calculates an average value of the at least two output values for each of the light receiving elements acquired by the process executed by the conversion processing unit. The optical unit may further include an integrating unit and a signal holding unit. The integrating unit converts an output signal from each of the light receiving elements of the image sensor into voltage. The signal holding unit holds the voltage converted by the integrating unit. In this case, the A/D converter may convert the holding voltage at the signal holding unit into a digital value. Further, the conversion process may be a process of converting the holding voltage from an identical one of the light receiving elements at least twice within a preset time range with the A/D converter, to acquire at least two output values.

In such a configuration, by the series of conversion processes for each of the plurality of light receiving elements, at least two output values are acquired for each of the light receiving elements, and the average value of the at least two output values is calculated for each of the light receiving elements. Accordingly, provided that any of the output values becomes an inaccurate value due to the influence of noises, the average value is calculated using the inaccurate value and other accurate value. Hence, the present configuration is less susceptible to the influence of noises.

(2) The optical unit may further include a setting accepting unit that accepts setting of a cycle. In this case, the conversion processing unit may repeatedly execute a series of the conversion processes for each of the plurality of light receiving elements at the cycle accepted by the setting accepting unit. Further, the number of the output values for each of the light receiving elements acquired in the preset time range may vary according to the cycle accepted by the setting accepting unit.

In such a configuration, the series of conversion processes for each of the plurality of light receiving elements is repeatedly executed at the set cycle, and for each series of conversion processes, the output values in the number according to the cycle are acquired for each of the light receiving elements. The number according to the cycle assumes, for example, a greater value as the cycle is longer, and assumes a smaller value as the cycle is shorter. In this case, as the set cycle is longer, the output values are acquired in a greater number for calculating the average value. Thus, the present configuration becomes more unlikely to be influenced by noises.

(3) The number of the output values for each of the light receiving elements acquired within the preset time range may be a constant number.

In such a configuration, the average value is calculated by acquiring the output values always in a constant number. Hence, the present configuration is stably less susceptible to the influence of noises.

(4) The optical unit may further include a setting accepting unit that accepts, for each of the light receiving elements, setting of the number of the output values for each of the light receiving elements acquired within the preset time range.

In such a configuration, the average value is calculated by acquiring the output values differing in number for each of the light receiving elements. Thus, setting a proper value taking into consideration of noises for each of the light receiving elements, the present configuration becomes more unlikely to be influenced by the noises.

(5) A spectroscope of the present invention includes: the optical unit; and a diffraction grating that disperses light at a grating surface, to cause light beams of the dispersed light at respective wavelengths to become incident on the plurality of light receiving elements.

Effects of the Invention

According to the present invention, provided that any of the output values becomes an inaccurate value by the influence of noises, the average value is calculated using the inaccurate value and other accurate value. Hence, the present invention is less susceptible to the influence of noises.

MODES FOR CARRYING OUT THE INVENTION

1. Configuration of Spectrometer

Figure 1:
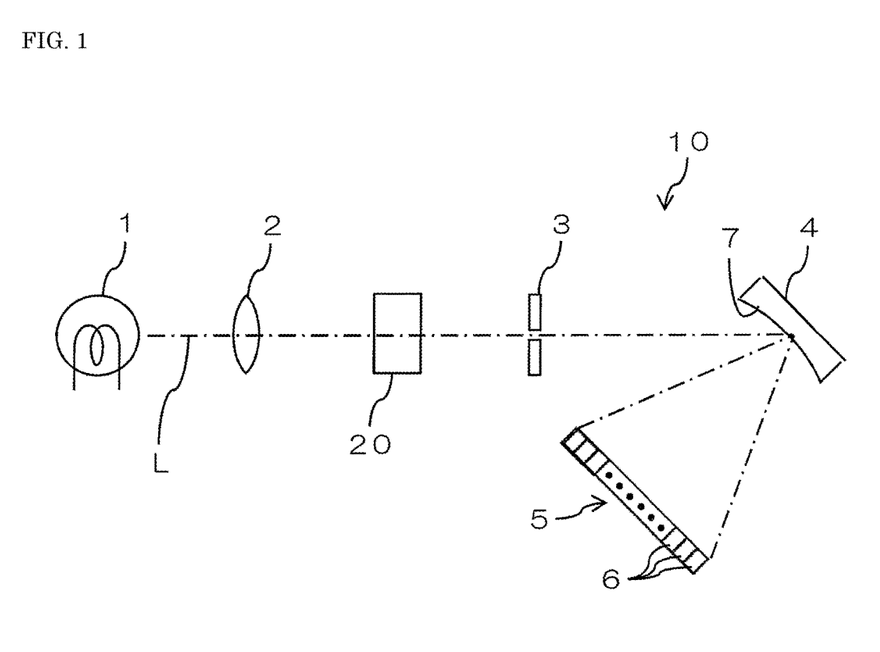
FIG. 1 is a schematic diagram showing an exemplary configuration of a spectrometer according to a first embodiment of the present invention.

FIG. 1 is a schematic diagram showing an exemplary configuration of a spectrometer according to a first embodiment of the present invention. The spectrometer includes an optical system 10 that includes: a light source 1; a condenser lens 2; a slit plate 3; a diffraction grating 4; a PDA (photodiode array detector) 5; and the like. In an analysis mode, a sample cell 20 being, for example, a flow cell, is disposed on an optical path L formed by the optical system 10, and a sample in the sample cell 20 is irradiated with light such as white-color light.

Light emitted from the light source 1 is condensed by the condenser lens 2, and the sample in the sample cell 20 is irradiated therewith. Out of the light having transmitted through the sample cell 20, the light having transmitted through the slit plate 3 becomes incident on the diffraction grating 4. The diffraction grating 4 has a grating surface 7 being concave, for example. The light having transmitted through the sample cell 20 is dispersed by the grating surface 7 into light beams of respective wavelengths. The condenser lens 2 is an exemplary light condensing element, and may be formed by other member such as a parabolic mirror, so long as being capable of condensing light from the light source 1.

The PDA 5 is an exemplary image sensor, and includes a plurality of light receiving elements 6 disposed in a row. The light beams of respective wavelengths dispersed by the diffraction grating 4 become incident on respective light receiving elements 6 of the PDA 5. Accordingly, based on respective output signals from the light receiving elements 6, a light amount for each wavelength can be calculated.

Figure 2:
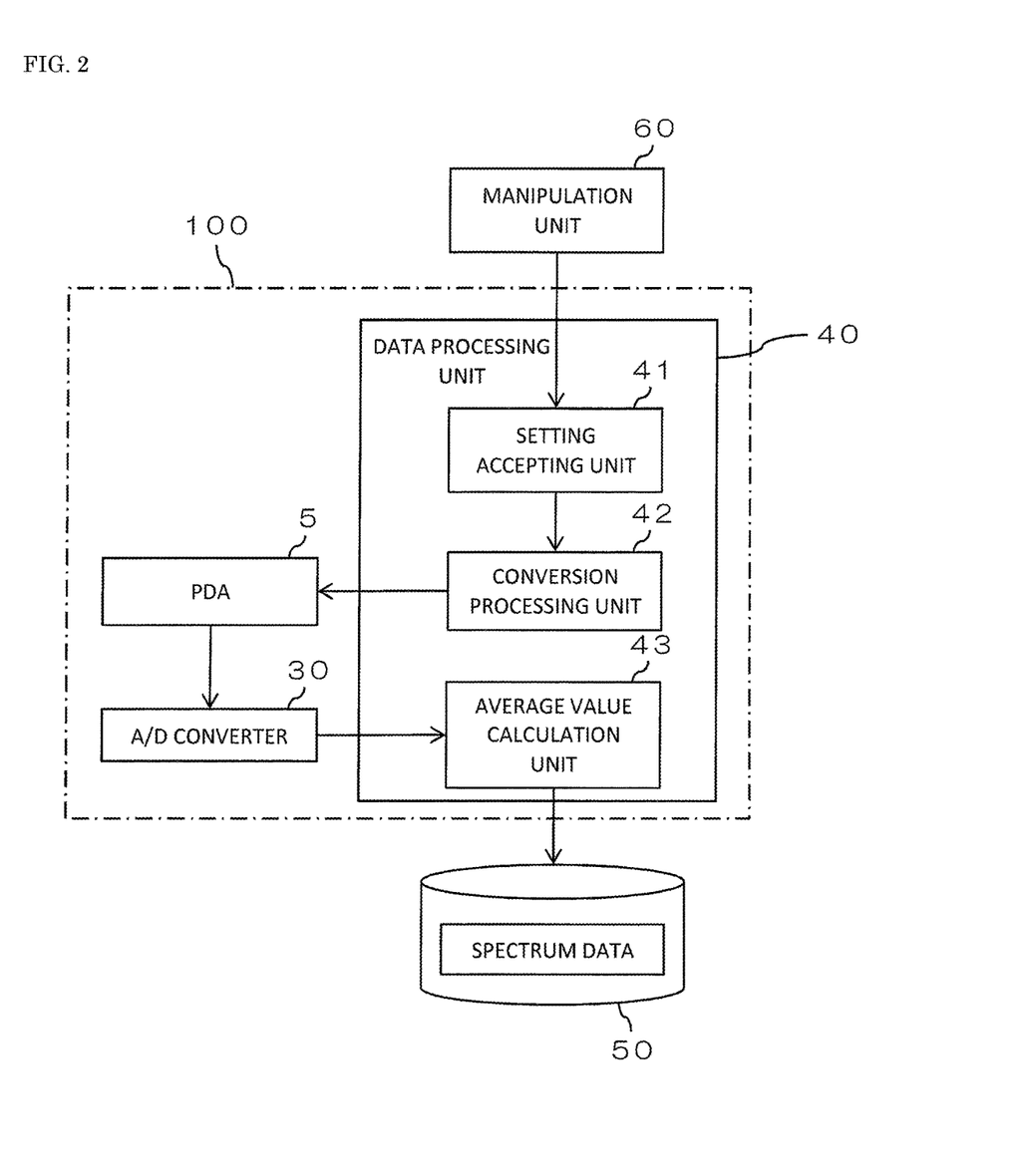
FIG. 2 is a block diagram showing an electrical configuration of the spectrometer shown in FIG. 1.

FIG. 2 is a block diagram showing an electrical configuration of the spectrometer shown in FIG. 1. As shown in FIG. 2, the spectrometer according to the present embodiment includes an A/D converter 30, a data processing unit 40, a storage unit 50, a manipulation unit 60 and the like. Based on the operations of these units, signals from the light receiving elements 6 of the PDA 5 are processed.

The PDA 5, the A/D converter 30, and the data processing unit 40 form an optical unit 100. Further, the optical unit 100 and the diffraction grating 4 form a spectroscope for dispersing incidental light to acquire spectrum data.

The A/D converter 30 converts analog signals (output signals) from the light receiving elements 6 of the PDA 5 into digital signals. The data processing unit 40 receives, as output values, the values representing the received light amounts of the light receiving elements 6, respectively, which have been digitally converted by the A/D converter 30.

The data processing unit 40 is configured to include, for example, a CPU (Central Processing Unit). By the CPU executing a program, the program realizes the functions of the setting accepting unit 41, the conversion processing unit 42, the average value calculation unit 43 and the like. The storage unit 50 is formed by, for example, a hard disk or RAM (Random-Access Memory). The manipulation unit 60 is formed by, for example, a keyboard or a mouse.

When the operator performs a setting manipulation using the manipulation unit 60, the setting accepting unit 41 performs a process of accepting the setting. Specifically, a parameter such as an analysis condition set using the manipulation unit 60 is accepted by the setting accepting unit 41. Based on the parameter, the data processing unit 40 controls any operation of the PDA 5 or processes the output values from the A/D converter 30.

The conversion processing unit 42 causes the light receiving elements 6 of the PDA 5 to sequentially output signals to the A/D converter 30, thereby performing a process of converting the output signals from the light receiving element 6 with the A/D converter 30 (the conversion process). In each of the light receiving elements 6, charges are accumulated in accordance with the received light amount, and an output signal according to the charge amount is converted by the A/D converter 30, to provide an output value. The conversion process on the output signal of each of the light receiving elements 6 is performed for all the light receiving elements 6 according to a certain order. By a series of conversion processes (the scan operation) for all the light receiving elements 6 being repeatedly performed for a plurality of times, the output value for each of the light receiving elements 6 is acquired at a predetermined cycle. Note that, between the PDA 5 and the A/D converter 30, a preamplifier circuit (not shown) may be provided. The preamplifier circuit includes, for example, an integrating unit and a signal holding unit. The integrating unit converts the output signals from the light receiving elements 6 of the PDA 5 into voltage. The signal holding unit holds the voltage converted by the integrating unit. In this case, the A/D converter 30 may convert the holding voltage at the signal holding unit into a digital value. By controlling the preamplifier circuit (the signal holding unit), the conversion processing unit 42 may convert the output signals (the holding voltage at the signal holding unit) from the light receiving elements 6 of the PDA 5 by the A/D converter 30.

In the present embodiment, the operator can arbitrarily set the above-described cycle by manipulating the manipulation unit 60. That is, the conversion processing unit 42 repeatedly executes a series of conversion processes for a plurality of light receiving elements 6 at a cycle accepted at the setting accepting unit 41. As the cycle is longer, the received light amount at each of the light receiving elements 6 becomes greater, and the present embodiment becomes less susceptible to the influence of noises.

In the series of conversion processes as described above, the conversion processing unit 42 converts an output signal from an identical one of the light receiving elements 6 at least twice with the A/D converter 30. Thus, in one scan operation, at least two output values are acquired for each of the light receiving elements 6. The average value calculation unit 43 averages the at least two output values for each of the light receiving elements 6 acquired by the process of the conversion processing unit 42, so as to calculate the average value for each of the light receiving elements 6.

The average value for each of the light receiving elements 6 calculated as described above is stored in the storage unit 50 as spectrum data representing a received light amount at each wavelength. The spectrum data stored in the storage unit 50 is output as an analysis result in any of various modes such as displayed on a display unit (not shown), printed by a printer (not shown) or the like.

2. Specific Mode of Conversion Process

Figure 3:
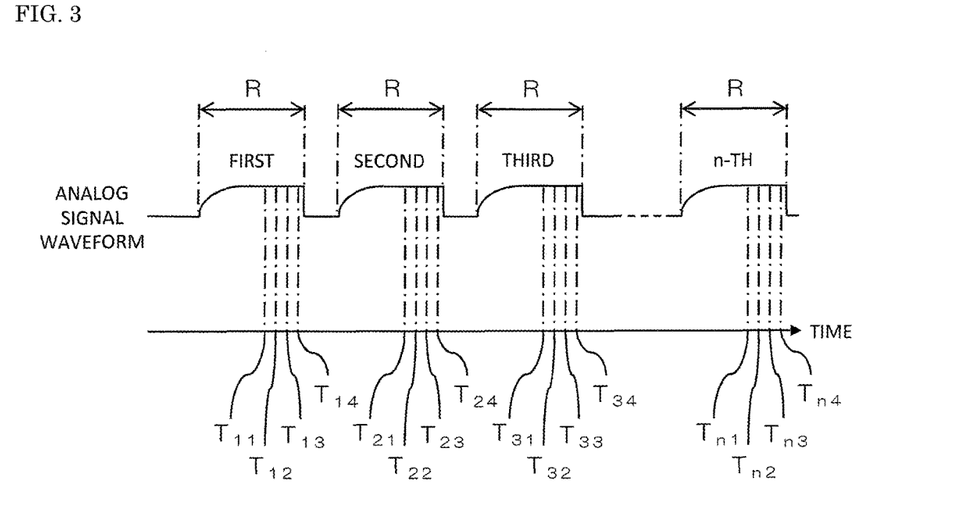
FIG. 3 is a timing chart for describing a specific mode of a conversion process.

FIG. 3 is a timing chart for describing a specific mode of the conversion process. A description will be given of an exemplary case where the PDA 5 includes n-pieces (where n is a natural number of 2 or greater) of light receiving elements 6, and analog signals from the light receiving elements 6 are converted into digital signals with the A/D converter 30.

As shown in FIG. 3, the waveform of an analog signal output from each of the light receiving elements 6 appears as a rectangular wave with a mild rising edge, due to the influence of the PDA 5 or the time constant of the circuit. In this exemplary case, for each of the light receiving elements 6, the conversion process is performed for four times within a preset time range R. The timing of the conversion process for each of the light receiving elements 6 is set as many as possible within the time range R after the waveform has fully risen.

That is, in this exemplary case, while the conversion process is performed at four timings $T_{n1}$ to $T_{n4}$ for each of the light receiving elements 6, the number of times of performing the conversion process is not specified to four, and varies according to the length of the time range R. The time range R is preset according to the cycle at which a series of conversion processes is repetitively executed. Accordingly, the number of output values for each of the light receiving elements 6 acquired in the preset time range R (four in the exemplary case shown in FIG. 3) varies according to the cycle accepted at the setting accepting unit 41. Specifically, the number of output values assumes a greater value as the cycle is longer, and assumes a smaller value as the cycle is shorter.

3. Process by Data Processing Unit Performing Analysis

Figure 4:
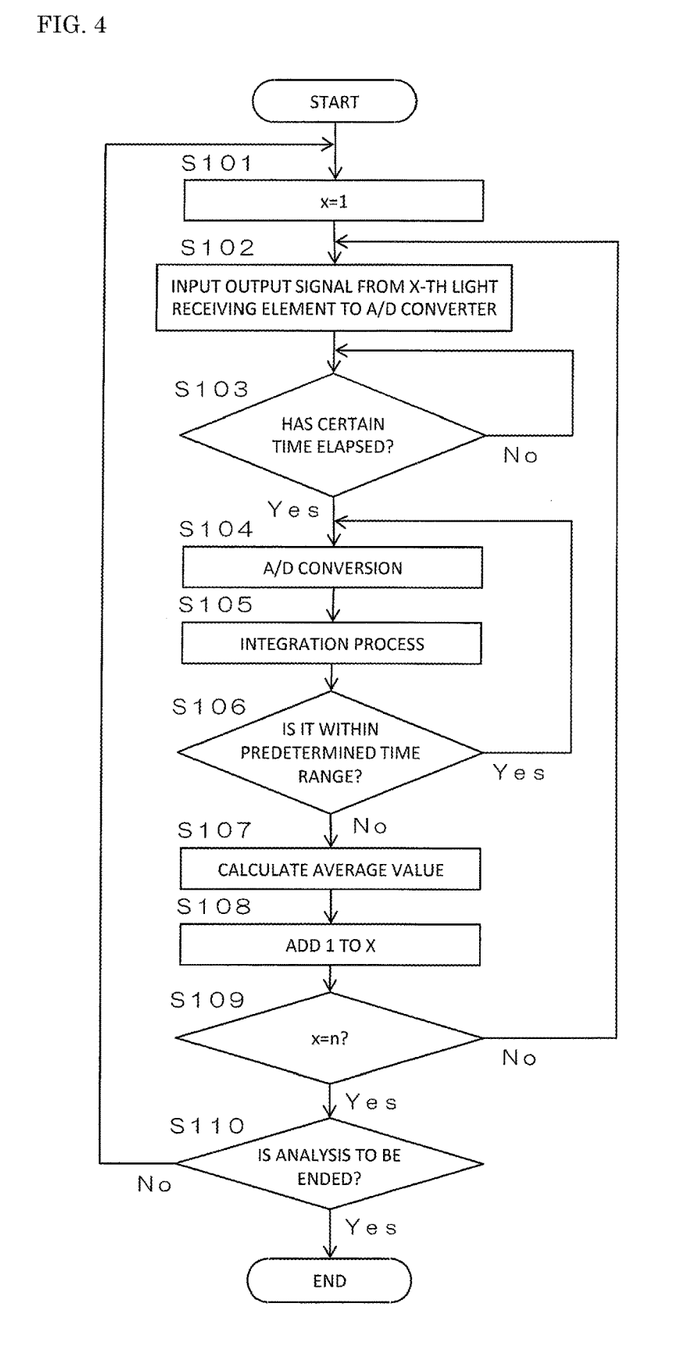
FIG. 4 is a flowchart showing an exemplary process performed by a data processing unit performing an analysis.

FIG. 4 is a flowchart showing an exemplary process performed by the data processing unit 40 performing an analysis. During an analysis, an output signal from an x-th (x=1, 2, 3, . . . , n) light receiving element 6 in the PDA 5 is sequentially converted by the A/D converter 30.

Specifically, when an analysis is started, firstly, an output signal from the first light receiving element 6 is input to the A/D converter 30 (Steps S101, S102). Thereafter, after a lapse of a certain time where the waveform has fully risen (Yes in Step S103), the A/D conversion is repeatedly performed as many as possible within the predetermined time range R, and a process of integrating the acquired output values is performed (Steps S104 to S106).

When the predetermined time range R expires (No in Step S106), the integration value of the output values at that time point is divided by the number of acquired output values (the number of times of the A/D conversion), to calculate the average value of the output values (Step S107). Then, subsequently, for the second light receiving element 6 (Step S108, No in S109), the processes in Steps S102 to S108 are performed.

In this manner, the processes in Steps S102 to S108 are sequentially executed up to the n-th light receiving element 6. The series of conversion processes (Steps S101 to S109) is repeatedly executed at a preset cycle until the analysis ends (until Yes in Step S110).

4. Operation and Effect of First Embodiment (1) In the present embodiment, by a series of conversion processes (one scan operation) for a plurality of light receiving elements 6, at least two output values (four in the exemplary case shown in FIG. 3) for each of the light receiving elements 6 are acquired, and the average value of the at least two output values is calculated for each of the light receiving elements 6. Accordingly, provided that any of the output values becomes an inaccurate value due to the influence of noises, the average value is calculated using the inaccurate value and other accurate value(s). Hence, the present embodiment is less susceptible to the influence of noises.

(2) In particular, in the present embodiment, a series of conversion processes for each of the plurality of light receiving elements 6 is repeatedly executed at a set cycle, and for each series of conversion processes, the output values in number corresponding to the cycle (four in the exemplary case shown in FIG. 3) are acquired for each of the light receiving elements 6. Specifically, as the set cycle is longer, the output values are acquired in a greater number for calculating the average value. Thus, the present embodiment becomes more unlikely to be influenced by noises.

5. Second Embodiment

In the first embodiment, the description has been given of the configuration in which the number of output values for each of the light receiving elements 6 acquired within the preset time range R varies according to the cycle at which a series of conversion processes is repetitively executed. A second embodiment is different from the first embodiment in that the number of output values for each of the light receiving elements 6 acquired within the preset time range R is a constant number (at least two).

Figure 5:
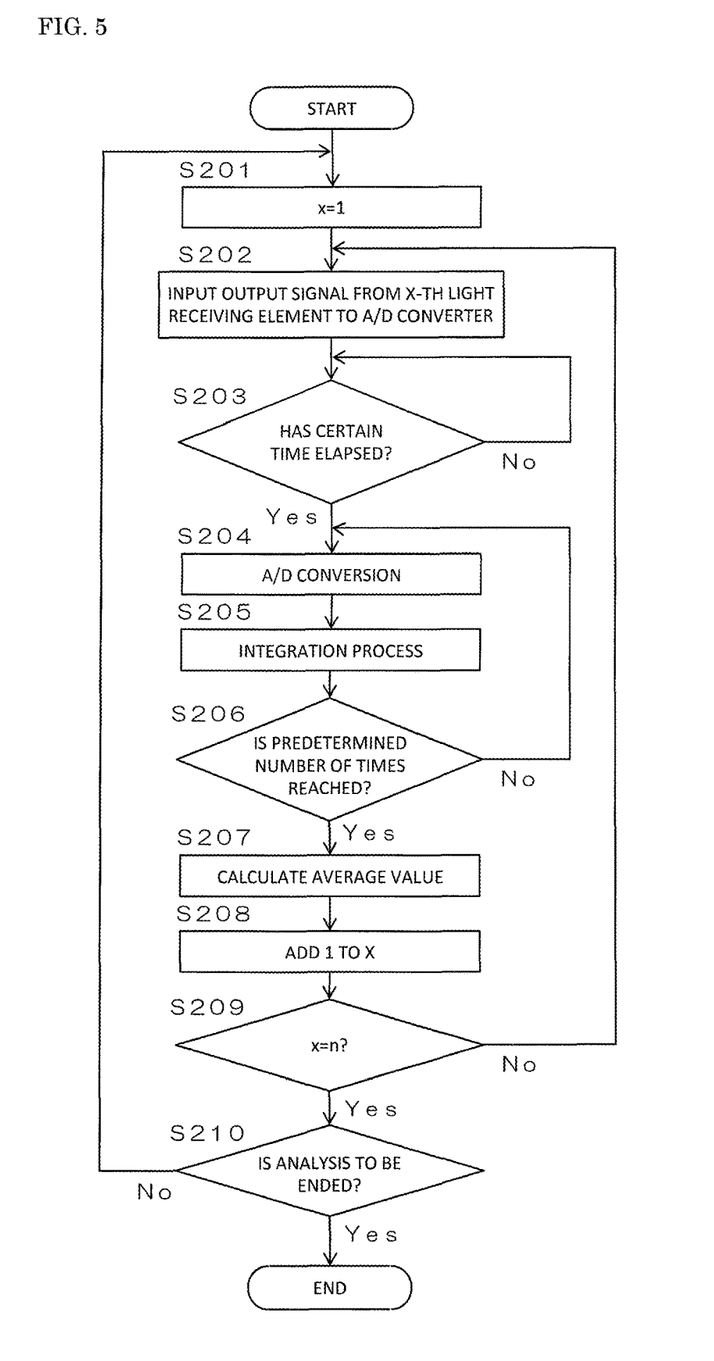
FIG. 5 is a flowchart showing an exemplary process performed by a data processing unit performing an analysis according to a second embodiment.

FIG. 5 is a flowchart showing an exemplary process performed by the data processing unit 40 performing an analysis according to the second embodiment. During an analysis, an output signal from an x-th (x=1, 2, 3, . . . , n) light receiving element 6 in the PDA 5 is sequentially converted by the A/D converter 30.

Specifically, when an analysis is started, firstly, an output signal from the first light receiving element 6 is input to the A/D converter 30 (Steps S201, S202). Thereafter, after a lapse of a certain time where the waveform has fully risen (Yes in Step S203), the A/D conversion is repeatedly performed for a certain number of times (a predetermined number of times of at least twice), and a process of integrating the acquired output values is performed (Steps S204 to S206).

When the A/D conversion has been performed for the certain number of times (Yes in Step S206), the integration value of the output values at that time point is divided by the number of times of the A/D conversion which is the above-described certain number of times, to calculate the average value of the output value (Step S207). Then, subsequently, for the second light receiving element 6 (Step S208, No in S209), the processes in Steps S202 to S208 are performed.

In this manner, the processes in Steps S202 to S208 are sequentially executed up to the n-th light receiving element 6. The series of conversion processes (Steps S201 to S209) is repeatedly executed at a preset cycle until the analysis ends (until Yes in Step S210).

In the present embodiment, similarly to the first embodiment, by a series of conversion processes (one scan operation) for a plurality of light receiving elements 6, at least two output values are acquired for each of the light receiving elements 6, and the average value of the at least two output values is calculated for each of the light receiving elements 6. Accordingly, provided that any of the output values becomes an inaccurate value due to the influence of noises, the average value is calculated using the inaccurate value and other accurate value. Hence, the present embodiment is less susceptible to the influence of noises.

In particular, in the present embodiment, the average value is calculated by acquiring output values always in a constant number. Hence, the present embodiment is stably less susceptible to the influence of noises.

6. Third Embodiment

In the first embodiment, the description has been given of the configuration in which the number of output values for each of the light receiving elements 6 acquired within a preset time range R varies according to the cycle at which a series of conversion processes is repetitively executed. A third embodiment is different from the first embodiment in that the setting on the number of output values for each of the light receiving elements 6 acquired within the preset time range R is accepted by the setting accepting unit 41 for each of the light receiving elements 6.

Figure 6:
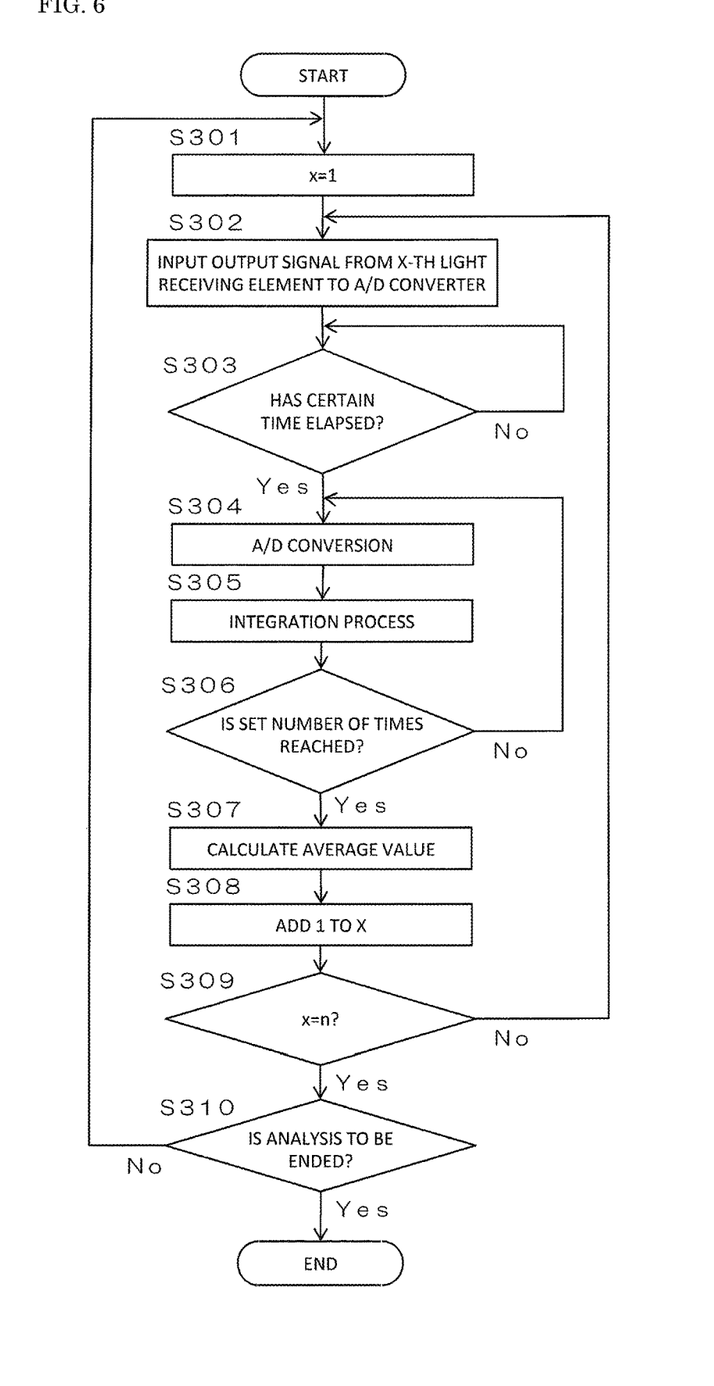
FIG. 6 is a flowchart showing an exemplary process performed by a data processing unit performing an analysis according to a third embodiment.

FIG. 6 is a flowchart showing an exemplary process performed by the data processing unit 40 performing an analysis according to the third embodiment. During an analysis, an output signal from an x-th (x=1, 2, 3, . . . , n) light receiving element 6 in the PDA 5 is sequentially converted by the A/D converter 30.

Specifically, when an analysis is started, firstly, an output signal from the first light receiving element 6 is input to the A/D converter 30 (Steps S301, S302). Thereafter, after a lapse of a certain time where the waveform has fully risen (Yes in Step S303), the A/D conversion is repeatedly performed for a certain number of times set for each of the light receiving elements 6 (a set number of times of at least twice), and a process of integrating the acquired output values is performed (Steps S304 to S306).

When the A/D conversion has been performed for the set number of times (Yes in Step S306), the integration value of the output values at that time point is divided by the number of times of the A/D conversion which is the above-described set number of times, to calculate the average value of the output values (Step S307). Then, subsequently, for the second light receiving element 6 (Step S308, No in S309), the processes in Steps S302 to S308 are performed.

In this manner, the processes in Steps S302 to S308 are sequentially executed up to the n-th light receiving element 6. The series of conversion processes (Steps S301 to S309) is repeatedly executed at a preset cycle until the analysis ends (until Yes in Step S310).

In the present embodiment, similarly to the first embodiment, by a series of conversion processes (one scan operation) for a plurality of light receiving elements 6, at least two output values are acquired for each of the light receiving elements 6, and the average value of the at least two output values is calculated for each of the light receiving elements 6. Accordingly, provided that any of the output values becomes an inaccurate value due to the influence of noises, the average value is calculated using the inaccurate value and other accurate value. Hence, the present embodiment is less susceptible to the influence of noises.

In particular, in the present embodiment, the average value is calculated by acquiring output values differing in number for each of the light receiving elements 6. Thus, setting a proper value taking into consideration of noises for each of the light receiving elements 6, the present embodiment becomes more unlikely to be influenced by the noises.

7. Variations

In the above-described embodiments, the description has been given of the case where the PDA 5 is used as an exemplary image sensor having a plurality of light receiving elements 6. However, the present invention is not specified to such a configuration, and any of various kinds of image sensors such as a CCD (Charge-Coupled Device) image sensor can be used.

The diffraction grating 4 is not specified to the structure having the concave grating surface 7, and may have a grating surface of other shape such as convex. Further, the diffraction grating 4 is not specified to the reflection-type diffraction grating which disperses incidental light when reflecting the light, and may be a transmission-type diffraction grating which disperses incidental light when transmitting the light.

In the above-described embodiments, the description has been given of the case where the optical unit 100 according to the present invention is used for a spectrometer as a spectroscope in combination with the diffraction grating 4. However, the present invention is not specified to such a configuration, and the optical unit 100 may receive light entering from any part other than the diffraction grating 4 by the plurality of light receiving elements 6, and is applicable to any of various optical apparatuses, without being specified to a spectrometer.

DESCRIPTION OF REFERENCE SIGNS 1 light source
2 condenser lens
3 slit plate
4 diffraction grating
5 PDA (photodiode array detector)
6 light receiving element
7 grating surface
10 optical system
20 sample cell
30 A/D converter
40 data processing unit
41 setting accepting unit
42 conversion processing unit
43 average value calculation unit
50 storage unit
60 manipulation unit
100 optical unit

The invention claimed is:

1. A spectroscope comprising an optical unit and a diffraction grating, wherein the optical unit comprising:
   an image sensor having a plurality of light receiving elements;
   an A/D converter that converts an output signal from each of the light receiving elements of the image sensor;
   a conversion processing unit that sequentially executes, for the plurality of light receiving elements, a conversion process of converting an output signal from an identical one of the light receiving elements at least twice within a preset conversion process time for each of the light receiving elements with the A/D converter, to acquire at least two output values; and
   an average value calculation unit that calculates an average value of the at least two output values for each of the light receiving elements acquired by the process executed by the conversion processing unit,
   wherein the diffraction grating disperses light at a grating surface, to cause light beams of the dispersed light at respective wavelengths to become incident on the plurality of light receiving elements.

2. The spectroscope according to claim 1, further comprising a setting accepting unit that accepts setting of a cycle, wherein
   the conversion processing unit repeatedly executes a series of the conversion processes for each of the plurality of light receiving elements at the cycle accepted by the setting accepting unit, and
   a number of the output values for each of the light receiving elements acquired in the conversion process time varies according to the cycle accepted by the setting accepting unit.

3. The spectroscope according to claim 1, wherein a number of the output values for each of the light receiving elements acquired within the conversion process time is a constant number.

4. The spectroscope according to claim 1, further comprising a setting accepting unit that accepts, for each of the light receiving elements, setting of a number of the output values for each of the light receiving elements acquired within the conversion process time.

* * * * *